Patented June 25, 1940

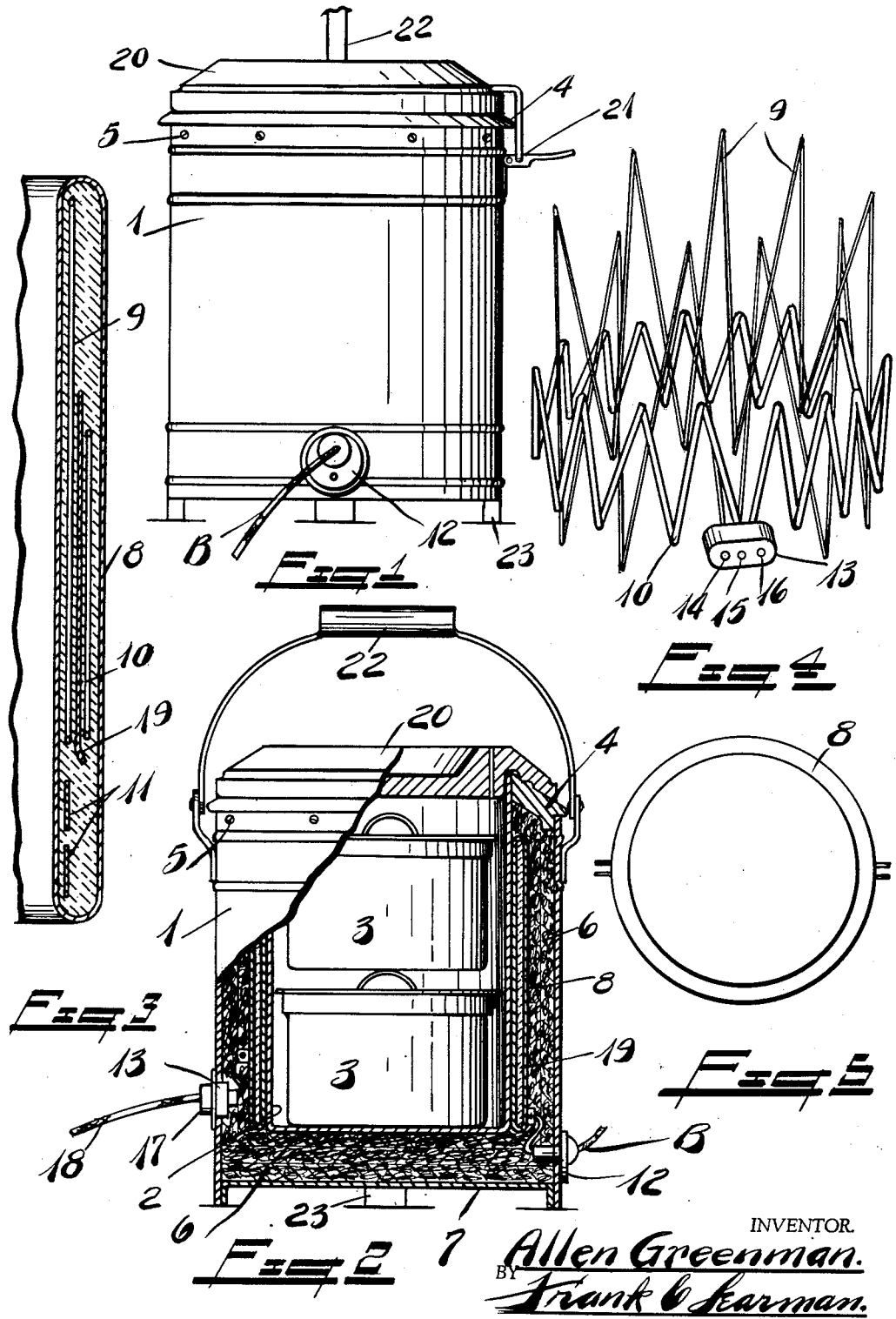

2,205,884

UNITED STATES PATENT OFFICE 2,205,884

ELECTRICAL COOKING DEVICE

Alien Greenman, Bay City, Mich.

Application April 12, 1937, Serial No. 136,258

3 Claims. (Cl. 219—35)

The invention relates to electrical cooking devices, and has for its object to provide a device of this character having insulated walls and a heating element having windings whereby the device may be heated from a low voltage battery, for instance an automobile battery, or from a higher voltage source, for instance a house circuit with a voltage of 110 volts.

A further object is to provide insulating material between the spaced walls of the receptacle and further provide a sleeve around the inner wall of the receptacle, which sleeve carries as a unit, the heating elements for heating the cooker.

A further object is to provide the heating element with a double winding adapting the device to a low voltage battery energy supply, or to a house lighting circuit.

A further object is to provide the cooker with a removable bottom whereby the parts may be assembled through the bottom and a heating unit sleeve telescopically placed on the well casing.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Fig. 1 is a view in elevation of the cooker.

Fig. 2 is a vertical longitudinal sectional view through the cooker.
Fig. 3 is a vertical transverse sectional view through the cooker.

Fig. 4 is a perspective view of the multiple winding of the heating element.

Fig. 5 is a top plan view of the heating element.
Referring to the drawing, the numeral 1 designates the outer metallic wall or shell of the cooker and 2 the inner cooking well in spaced relation thereto, and in which various utensils 3 may be placed. The upper end of the well 2 is supported by a ring 4 to which the outer shell is secured by means of screws 5, the lower end of the well terminating at a point spaced from the lower end of the casing 1, thereby providing space for layers of insulating material 6 as usual.
The lower end of the casing 1 is provided with a removable bottom 7 which, when removed, allows access to the interior of the cooker, it permits rapid assembling of the cooker parts and facilitates access to the shell for repairs etc.
In devices of this character, heretofore constructed, provision has not been made for heating the cooker from a low voltage source of energy, for instance an automobile battery, or from a higher voltage circuit, for instance a house lighting circuit, and this is accomplished in the present construction, which includes a sleeve shaped heating element 8, which element telescopically engages the outer periphery of the cooker well 2 as clearly shown in Figure 2 of the drawing. Disposed within the metal encased heating element 8 are spaced resistance members 9 and 10. The resistance coils 9 are lighter than the coils 10 to enable the user to obtain a high or low temperature according to the desire, these coils receiving energy from a high voltage system, for instance a house lighting system.

The so-called auto element is indicated at 11 and may be a ribbon heating element wound around in the lower end of the sleeve heating element and leading to an outlet 12, and to which a suitable plug and cord "B" are connected when the device is used in connection with a storage battery. With this arrangement the cooker can be used by tourists on the road by connecting to the storage battery of a vehicle, or it can be used in the home by plugging into the house circuit in the usual manner. It has another advantage, in that the cooking operation may take place in the home where there is ample voltage and the contents kept warm by a battery connection in an automobile, although it will be clearly understood that when touring the cooking is done by energy furnished from the storage battery of the automobile.

Referring to Figure 4, it will be noted that the connector block 13 for the house heating element is provided with three connector apertures or posts 14, 15 and 16, and by shifting a conventional two-prong plug 17 either coil 9 or 10 may be placed in operation. The plug 17 is provided with a conductor wire member 18 which may terminate in any suitable type of connector for attaching the device to an outlet plug. Interposed between the coils in the heating element 8 I provide mica strips 19 all of which are held in position by the usual cement.

The insulating material may be asbestos or other cellular material, and the cooker well is preferably formed from aluminum. The resistance element 11 which makes up the auto element is made up of #26 chromel C resistance ribbon and uses about eighteen (18) amperes.

The resistance wires 9 and 10 which make up the home element may be formed from any kind of material, however, it has been found that for the high voltage resistance 9 a number twenty-one chromel C resistance wire gives the best results. It is possible to receive a medium and high temperature. All ordinary cooking can be done on medium temperature, which uses about two and one half amperes. This reduces the cost to about one half that of operating a conventional form of flat iron, and this is further insured by the insulating material, causing the heat to build up to a high degree. The high heat uses three point nine amperes, which is considerably less than a flat iron uses, and makes easy the baking of bread, pies, cakes, etc. For baking purposes high temperature is used for a short time, followed by a medium heat. The use of 300 to 475 watts on the home element makes it possible to obtain the same results as 1,500 watts required by many cookers because of the high degree of insulation provided in the insulation of the device.

A suitable cover 20 forms a closure for the upper open end of the cooking well and clamps 21 serve to secure the cover in position, this upper ring and cover construction being the subject matter of a separate application filed by me of even date herewith.

The combination herein described can be easily, quickly and economically manufactured and assembled, and the cooker is very efficient in operation.

A handle 22 can be attached to the shell for easy transportation of the cooker and feet 23 are provided for spacing the cooker from the floor.

From the foregoing description it will be obvious that I have perfected a very simple, practical, economical and efficient electrical cooker for use with an automobile or in the home.

What I claim is:

1. A portable cooker comprising an outer casing, an inner casing in spaced relation to the outer casing, a cellular insulating material between the inner and outer casings and a removable unitary completely enclosed heating element surrounding the outer wall of the inner casing in engagement therewith and telescopically received thereon, coils in said sleeve shaped element, terminals on the outer wall of said element and directly adjacent the lower end thereof, electrical plugs mounted on the outer wall of the outer casing and connected with said terminals, and a removable bottom plate forming a closure for the lower end of said outer casing to permit the removal of the sleeve element as a unit without disturbing the remainder of the cooker parts.

2. A device as set forth in claim 1 including means carried by the heating element independent of each other whereby said cooker may be operated on a high voltage circuit, or on a low voltage circuit.

3. The combination with a portable cooker comprising an outer casing with an open lower end, an inner well casing within the outer casing in spaced relation thereto, a closed unitary sleeve-shaped heating element telescopically engaging the inner wall casing on its outer periphery, an insulating material surrounding said inner well and sleeve-shaped element, resistance coils mounted in said sleeve-shaped element, terminals mounted on said element adjacent the lower end thereof and connected to said coils, a removable bottom plate forming a closure for the lower end of the outer well, said plate being removable to permit the removal of the sleeve-shaped heating element as a unit without removal or disturbance of the remainder of the cooker.

ALLEN GREENMAN.